United States Patent
Hernandez

(10) Patent No.: US 9,738,856 B2
(45) Date of Patent: Aug. 22, 2017

(54) SILICA-BASED STRUCTURANTS AND PROCESSES FOR MAKING THEREOF

(71) Applicant: Paben Proyectos Estrategicos, S.A. de C.V., Nuevo Leon (MX)

(72) Inventor: Enrique Hernandez, Houston, TX (US)

(73) Assignee: PABEN PROYECTOS ESTRATEGICOS, S.A. DE C.V., Nuevo Leon (MX)

( * ) Notice: Subject to any disclaimer, the term of this patent is extended or adjusted under 35 U.S.C. 154(b) by 172 days.

(21) Appl. No.: 14/639,644

(22) Filed: Mar. 5, 2015

(65) Prior Publication Data

US 2015/0175937 A1    Jun. 25, 2015

Related U.S. Application Data

(63) Continuation of application No. PCT/US2013/057835, filed on Sep. 3, 2013.

(60) Provisional application No. 61/698,096, filed on Sep. 7, 2012.

(51) Int. Cl.
| | |
|---|---|
| C11D 3/08 | (2006.01) |
| C11D 7/14 | (2006.01) |
| C11D 3/12 | (2006.01) |
| C01B 33/18 | (2006.01) |
| C11D 3/04 | (2006.01) |

(52) U.S. Cl.
CPC ............ *C11D 3/08* (2013.01); *C01B 33/18* (2013.01); *C11D 3/042* (2013.01); *C11D 3/1246* (2013.01)

(58) Field of Classification Search
CPC ....... C11D 3/08; C11D 3/1246; C11D 3/1253; C11D 3/1266; C11D 7/14; C11D 17/0026
See application file for complete search history.

(56) References Cited

U.S. PATENT DOCUMENTS

| | | | | |
|---|---|---|---|---|
| 3,708,428 | A | * | 1/1973 | McDonald ............ C11D 3/124 510/426 |
| 3,886,079 | A | | 5/1975 | Burke |
| 4,421,657 | A | | 12/1983 | Allen et al. |
| 5,336,430 | A | * | 8/1994 | Bahary ................ C11D 3/0042 510/108 |
| 5,871,867 | A | | 2/1999 | Rausch et al. ................ 429/247 |
| 6,159,927 | A | * | 12/2000 | Kandasamy ............ C11D 1/29 510/404 |
| 6,284,288 | B1 | * | 9/2001 | Gubelmann ............ A61K 8/19 424/401 |
| 6,369,020 | B1 | | 4/2002 | Kohlus et al. |
| 7,985,392 | B2 | | 7/2011 | Hayashi et al. |
| 2003/0003040 | A1 | | 1/2003 | Lindner et al. |
| 2004/0152617 | A1 | | 8/2004 | Murphy et al. |
| 2005/0129628 | A1 | | 6/2005 | Stanier et al. ................. 424/49 |
| 2005/0187130 | A1 | | 8/2005 | Brooker et al. |
| 2006/0142719 | A1 | | 6/2006 | Vogt et al. ................... 604/378 |
| 2007/0048339 | A1 | | 3/2007 | Popplewell |
| 2011/0021406 | A1 | | 1/2011 | Lant et al. |

FOREIGN PATENT DOCUMENTS

| | | | |
|---|---|---|---|
| AU | 15656/70 | 5/1970 | |
| CN | 1145330 A | 3/1997 | ............ C01B 33/12 |
| CN | 1606532 | 4/2005 | ............ C01B 33/193 |
| CN | 1668530 | 9/2005 | ............ C01B 33/12 |
| CN | 102471738 | 5/2012 | |
| EP | 0129239 A2 | 12/1984 | ............ C01B 33/28 |
| EP | 0445852 A1 | 9/1991 | ............ C11D 3/37 |
| FR | 2048926 | 3/1971 | |
| GB | 800694 | 9/1958 | |
| WO | 98/04670 | 2/1998 | |
| WO | 98/01390 | 5/1998 | |
| WO | 2010/117925 | 6/2006 | |
| WO | 2010/117925 | 10/2010 | |
| WO | 2010/122051 | 10/2010 | |
| WO | 2011/005905 | 1/2011 | |
| WO | 2011/090957 | 7/2011 | |
| WO | 2014/039437 | 3/2014 | |
| WO | 2014/040010 | 3/2014 | |

OTHER PUBLICATIONS

Chinese Office Action for Application Mo. 201380046694.6 dated Dec. 30, 2016, 17 pages, Dec. 30, 2016.
PCT Search Report for Application No. PCT/US2013/058869, dated Mar. 17, 2014; 12 pages, Mar. 17, 2014.
International Search Report and Written Opinion issued in PCT/US2013/057835, 9 pages, Aug. 19, 2014.
International Preliminary Report on Patentability issued in PCT/US2013/057835, 7 pages, Mar. 10, 2015.
Office Action for Chinese Patent Application No. 201380046694.6, 14 pages, Mar. 2, 2016.
Office Action for Australian Patent Application No. 2013312934, 5 pages, Mar. 24, 2016.
European Search Report for Application No. 13834611.9, 10 pages, Mar. 17, 2016.

* cited by examiner

*Primary Examiner* — Charles Boyer
(74) *Attorney, Agent, or Firm* — Baker Botts L.L.P.

(57) ABSTRACT

The disclosure relates to a silica-based structurant and methods of making such a structurant. According to one embodiment, the structurant may include 55 wt % to 90 wt % of a silica having a $[Na_2O]/[SiO_2]$ molar ratio of from 0.02 to 0.14 and at least 15 wt % of an adjunct salt. The structurant may have a hydrated particle size distribution such that no more than 30 wt % of the structurant has a hydrated particle size greater than 45 micrometers according to the Structurant Residue Test. The structurant may also have a tapped bulk density of from 200 g/L to 300 g/L. Methods of making the structurant include combining starting materials with a non-stoichiometric amount of acid, then drying the reaction mixture without first washing any silica-based particles to produce a silica-based structurant with adjunct salt.

14 Claims, No Drawings

SILICA-BASED STRUCTURANTS AND PROCESSES FOR MAKING THEREOF

CROSS-REFERENCE TO RELATED APPLICATION

This application is a continuation of International Application PCT/US2013/057835 filed Sep. 3, 2013; which claims the benefit of U.S. Provisional Application Ser. No. 61/698,096 filed Sep. 7, 2012, which is incorporated herein by reference.

TECHNICAL FIELD

The present invention relates to a silica-based structurant. Processes for making the structurant are also encompassed by the present invention.

BACKGROUND

Silica-based structurants have been developed for a variety of uses. However, the need remains for silica-based structurants designed particularly for specific applications, such as in cleaning products.

SUMMARY

The invention, in one embodiment, includes a structurant including 55 wt % to 90 wt % of a silica having a $[Na_2O]/[SiO_2]$ molar ratio of from 0.02 to 0.14 and at least 15 wt % of an adjunct salt. The structurant may have a hydrated particle size distribution such that no more than 30 wt % of the structurant has a hydrated particle size greater than 45 micrometers according to the Structurant Residue Test. The structurant may also have a tapped bulk density of from 200 g/L to 300 g/L.

The invention, according to another embodiment, includes a process of forming a structurant by combining water, $SiO_2$, $NaO_2$ and a non-stoichiometric amount of acid to form a silica mixture having a $[Na_2O]/[SiO_2]$ molar ratio of from 0.02 to 0.14, then drying the silica mixture to form a structurant. The structurant may be of the type described above.

The invention, according to still another embodiment, includes a process for forming a structurant by performing the following chemical reaction in a reaction mixture:

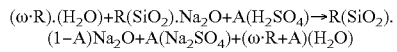

$$(\omega \cdot R).(H_2O)+R(SiO_2).Na_2O+A(H_2SO_4) \rightarrow R(SiO_2).(1-A)Na_2O+A(Na_2SO_4)+(\omega \cdot R+A)(H_2O)$$

wherein A is the amount of acid used in the reaction, relative to a stoichiometric ratio for complete neutralization, R is the silicate ratio, $[Na_2O]/[SiO_2]$ and $\omega$ is the molar amount of water added to the reaction mixture relative to moles of $SiO_2$. The reaction mixture may then be dried to obtain a structurant. The structurant may be of the type described above.

DETAILED DESCRIPTION

The present invention relates to a silica-based structurant and processes for making such a structurant.

In one embodiment, the silica-based structurant may include an absorbent particulate silica-based material that is capable of imparting physical stability to the structurant The structurant may have the ability to absorb excess or residual water, and aid in the rapid dispersion of the structurants from a structured agglomerated state into a finely divided state.

Furthermore, the structurant may be able to efficiently absorb cleaning actives that are added to the structured particle-making process while retaining the ability to quickly release the same cleaning actives when contacted with water. According to specific embodiments, the structurants can absorb high levels of cleaning actives, and have a Saturation Capacity of greater than about 1.5, preferably greater than about 2.0, and more preferably greater than about 2.3.

The structurant of the current invention may include amorphous silica, which may be made using any available methods. However, one specific method that may be particularly useful employs a controlled precipitation or sol-gel process, wherein alkaline silicate is neutralized with an acid in a dilute aqueous condition to make very fine particles, i.e. colloidal particles, of silica. The silica fine particles have particle size of less than about 40 micrometers, less than about 30 micrometers, or less than about 20 micrometers. The fine particles may associate together to form larger aggregates, i.e., micro-gels, in the aqueous suspension, where the aqueous phase of the suspension includes counterions of the neutralization reaction, i.e., a salt solution. The salt ions may be partially adsorbed onto the surface of the colloidal silica structure, for example within a micro-gel. Any commonly known alkaline silicate can be used in the neutralization reaction, although in one example the alkaline silicate may sodium silicate, particularly in one example with a $[SiO_2]/[Na_2O]$ molar ratio of from about 2 to 3.4 or from about 3.0 to 3.2. The acids or acidification agents used in the neutralization reaction may include, for example, $CO_2$, $H_2CO_3$, $H_2SO_4$, and $NaHCO_3$, preferably $H_2SO_4$.

In some embodiments, a portion of the salt solution may be separated and removed, for example by filtration or centrifugation, forming a wet cake having a semi-solid network of colloidal silica imbibed with aqueous salt solution.

The suspension or wet cake may be dried to form a powder having a composite structure, the composite structure having micron-scale discrete phases of amorphous silica aggregates and adjunct salt. The adjunct salt may be formed primarily by crystallization of the aqueous salt solution upon drying. Adjunct salt may be present within the aggregated structure of the colloidal silica, and may assist in the dispersion of aggregates when added to water, for non-limiting example in a washing process. In one embodiment, dispersion of silica aggregates during detergent use context may be facilitated by dissolution of the adjunct salt. Effective dispersion of silica aggregates reduces the incidence of residues on fabrics, for example, as measured in the Structurant Residue Test as described herein.

The product powder of this process is one embodiment of the structurant of the current invention. The structurant (i.e., powder) may have from about 0% to 40% water, from about 2% to 20% water, from about 4% to 10% water, by total weight, retained after drying.

The extent of the neutralization reaction, converting silicate to silica, may be substantially complete, or in a specific embodiment, partially complete. In the case of partial neutralization, an amount of alkali metal may remain in the amorphous silica phase of the structurant. In the amorphous silica phase of the structurant, the molar ratio of alkaline metal oxide, $[M_2O]$ where M is in alkaline metal, such as sodium, to silica $[SiO_2]$ may be from about 0 to about 0.14, from about 0.02 to about 0.14, from about 0.02 to about 0.10, or from about 0.04 to about 0.08.

In contrast to the current invention, commercial silica processing commonly removes all of the alkali metal salt, but for some limited uses, such as in battery separators, a salt content of 5-10%, particularly of sodium sulphate, may be permissible. However, the sulphate-containing precipitated silica used in battery separators has a pH value of 3.0 to 4.0, and would not be desirable since it would be harmful for acid-sensitive actives, such as for example, chelants, surfactants and enzymes. Thus, a desirable level of alkalinity is need for sufficient cleaning performance, particularly, without the need for costly addition of other ingredients (e.g., builders).

The alkalinity of the structurant may correlate to the extent of the neutralization reaction. For example, reducing the amount of acid or acidulant in the neutralization reaction to levels that are less than stoichiometric can result in a structurant having more alkali ions in the amorphous silica phase, thereby causing or contributing to higher alkalinity of the structurant. Therefore, it is expected that one may be able to adjust the alkalinity of the structurant by controlling the degree of neutralization. In an embodiment, a structurant with high alkalinity can have dual roles, acting both as a structural element with a high Saturation Ratio (i.e., carrying capacity) correlating to increase carrying capacity and as an alkaline stabilizer for acid-sensitive actives. Thus, in a specific embodiment, a structurant may have relatively high alkalinity by not having complete neutralization. For example, the structurant may have a pH from about 8.5 to about 11.0, from about 9.0 to about 10.5, and from about 9.5 to about 10.0, pH may be determined according to the Structurant pH Test as described herein.

Further, the structurant made by full or partial neutralization of alkaline silicate with acid may be washed and filtered to remove a portion of the soluble alkaline salt by-product. Alternatively, the full suspension reaction product, including soluble salts formed as a by-product of silicate neutralization, may be dried to form the structurant, for example in a powder formed.

The current accepted industry standards for making precipitated silica, i.e., that is silica produced by substantially complete neutralization reaction, includes filter and wash steps to remove salt by-products from the end product. However, silica from which the salt by-products, have not been removed either fully or partially, may allow the salts to be used as adjuncts for detergent processing.

According to one embodiment, a structurant of the present invention, which may be made with at least about 15 wt % of adjunct salt, may provide suitable structuring in terms of Saturation Capacity while also having good dispersibility and a significantly higher tapped bulk density compared to commercial silica. For example, commercial silica, which has no alkali metal salts, typically has a bulk density of from about 100 g/L to about 150 g/L.

In one embodiment, the structurant with at least 15 wt % adjunct salt, may have a tapped bulk density of from about 200 g/L to about 400 g/L, from about 200 g/L to about 300 g/L, from about 230 g/L to about 350 g/L, from about 200 g/L to about 280 g/L, or from about 220 g/L to about 280 g/L. In one embodiment, this increase in bulk density as compared to commercial silica correlates well with the processability for example though ease of handling of the powder material in an industrial process, such as, for example, a detergent granulation process.

To the extent that the structurant is relatively insoluble in wash water conditions, the structurant may be capable of sufficiently rapid dispersion from a structured agglomerated state into a finely-divided state, and passing through a fine-mesh screen. Example structurants of the present invention have a Structurant Residue Factor (RF) of less than about 0.5, less than about 0.3, less than about 0.1, or less than about 0.05, according to the Structurant Residue Test as described herein. According to one embodiment, the presence of adjunct salt in a concentration of at least about 10 wt % or at least about 15 wt % may provide a way to further aggregate the fine silica or silicate particles, increasing their bulk density and improving the handling of the structurant powder; while at the same time, the solubility of the salt-bound aggregates may provide excellent dispersion of the aggregates in wash-conditions, effectively mitigating risk of fabric residues. The Structurant Residue Factor correlates well with the products' propensity of leaving residue on fabrics, for example, when the structurant is a component of a structured particle, and the structured particle is used in a cleaning composition, such as a granular detergent product.

The structurant may be used to form a structured particle also containing a cleaning active. The cleaning active may be any functional cleaning chemistry that can be used as part of the structured particle. Suitable cleaning actives may include surfactants, chelants, polymers, enzymes, bleaching actives, anti-corrosion agents, care agents, perfumes, hueing agents, silicones, and any mixture thereof. The cleaning active may be suitable for cold-water and/or high water hardness cleaning, and may be sticky and/or hygroscopic in nature. The structured particle may also contain other components, such as a stabilizer. The stabilizer may be material that is capable of imparting chemical stability to the cleaning active.

The structured particle may be formulated, in certain embodiments, as a granular or powder cleaning product. For example, it may be in the form of a structured agglomerate, which is a particle containing a composite of ingredients, including the structurant. In one particular embodiment, the structured particle may be a seed that is later coated with layers. The structurant may be used in layers formed upon a seed also containing the structurant or formed from a different material.

Cleaning products containing the structurant may have certain advantages over even other cleaning products containing silica-based materials. For example, the size of the structurant may allow superior performance in various tests for cleaning product residues.

EXAMPLES

The following examples are provided to further illustrate specific embodiments of the disclosure. They are not intended to disclose or describe each and every aspect of the invention in complete detail and should be not be so interpreted.

Example 1

Saturation Capacity Test Method

The Saturation Capacity of a material, or example a powder, may be highly dependent on the substrate and the liquid that needs to be absorbed. There are several ways to measure the Saturation Capacity of the powder. A well known method, DIN 53601, uses a torque rheometer and DBP (Dibutyl Phtalate). Alternatively, an oil-absorption method, DIN ISO 787/5 may also be used. These methods record the evolution of the measured torque as the liquid is added at a controlled rate. A typical torque profile will have a slight increase initially over time followed by a sharp peak then a drop. The peak is typically defined as the saturation point of the powder. DIN 53601 calculates the amount of DBP added to the powder to reach the peak torque. However, this method uses a paddle that resembles a Z blade mixer. This design does not incorporate the chopping effect that occurs in most agglomeration processing, whereby oversized materials are typically reduced. The chopping action and breakage of oversized materials help in the surface renewal that improves the Saturation Capacity. In addition to this, the method uses a liquid that is significantly different in rheology than one would typically use in agglomeration. Finally, the structurant of the current invention has a composite structure having silica and salt phases; the latter being water soluble, therefore more interactive with aqueous actives of the current invention. For these reasons, the values typically obtained in such method give some indication of the material's internal structure or porosity, but may not necessarily correlate with the agglomeration relevant Saturation Capacity.

A modification of this well-accepted method obtains results that may be more relevant to agglomeration. The modified method involves measuring the resulting oversize material greater than about 1.4 mm at different AE3S paste addition levels. A 70% active aqueous paste of sodium alkylethoxysulfate, with an average molar ethoxylation of 3 (AE3S), is used as a standard liquid in this saturation capacity test. The 70% AE3S paste, also known as Sodium Lauryl Ether Sulfate (SLES 3EO) is available as a commercial feedstock material from a number of suppliers. The level of AE3S paste in relation to the powder is expressed as AE3S paste:powder weight ratio. The paste is dispersed using the Kenwood food processor (Mini Chopper/Mill CH180A) with internal diameter of about 10.4 cm. The % oversize is plotted on the Y axis and the AES paste:powder ratio on the X-axis. At least 5 data points are generated, preferably where the 2 first data point are below saturation, the third at or near its saturation, and the last 2 data points above its saturation. A least square fit using the 5 data points with Pearson coefficient of at least 0.9, preferably >0.95. The typical resulting curve is best described as an exponential curve. The saturation point is estimated at the intersection of this curve fit and the 10% oversize. The AE3S paste/powder weight ratio at this point is defined to be its Saturation Capacity. Beyond this point, any additional liquid loading will result to a significant increase in oversize. This would normally result in actual industrial practice to equipment make up (e.g., wet oversize sieve blinding) or process instability, especially in continuous agglomeration process.

The specific steps for conducting the Saturation Capacity Test are as follows:
1. Weigh approximately 20 g of the powder to be tested (where powder bulk density is approximately in the range of 100 to 300 gpl) in the small Kenwood food mixer. The powder weight could be adjusted depending on its bulk density to have similar fill level. AES paste is weighed out in a syringe. A hole can be drilled on top of the mixer in a location where the blades can chop the paste as it is being added.
2. Turn on the mixer and allow the powder to be mixed for 2 seconds prior to adding the AES paste. The paste is then added using the syringe at approximately 120 g/min. The mixer is continued for approximately 1 second after all the pasted has been added. The resulting agglomerate is then sieved through a 1.4 mm metal sieve for 1 minute. Oversized materials retained on the screen and the undersize materials that passed through the screen are weighed separately. Amount of oversized is calculated by % oversized=weight of oversize/(weight of oversize+weight of undersize)×100.
3. If the material's Saturation Capacity is totally unknown, a trial and error must be done to initially establish an indication as to where roughly the saturation point may lie. This is important to identify the spread of the 5 data point of AES paste:powder weight ratio later on as described above to quantify the Saturation Capacity. Weigh 2 different levels of AES paste in syringes. Each AES level is added to a new batch of pre-weighed powder as described above. A good example where one has acquired suitable estimate of the Saturation Capacity is when at least 1 point is below the saturation (<10% oversize) and the second data point is above saturation (>10% oversize).
4. Weigh 3 different amount of paste separately in addition to the first 2 data points used for initial estimation with paste quantities calculated as AES paste:powder ratio predefined in such manner that ideally the first 2 ratios will be below its saturation point, the third point close to its saturation point and the remaining 2 ratios are beyond its saturation point.
5. Plot the 5 data points with % oversize on the Y-axis and AES:Powder weight ratio on the X-axis. Using a least square curve fit, calculate the intersection of 10% oversize and solve for the AES:Weight Powder Ratio.
6. Saturation Capacity may be expressed as the ratio of an absorbed cleaning active relative to the mass of the structurant.

Example 2

Structurant Residue Test

The Structurant Residue Test is used to measure the amount of residue associated with a structurant material, especially an insoluble or sparingly-soluble structurant. Residue means the mass of material that is retained as a residue on a screen, fabric or other material acting as a filter. Structurant Residue means the amount of residue associated with a structurant, as measured using the Structurant Residue Test described below.

Residues determined through the Structurant Reside Test are relevant to the potential of incurring fabric residues as a result of washing. The principle of the Structurant Residue Test follows that of published International Standard ISO 3262-19:2000, Section 8, "Determination of residue on sieve". The method is adapted herein to suit a broader range of structurant materials applicable to the current invention. The specific steps for conducting the Structurant Residue Test are as follows:
1. Obtain a standard sieve consisting of a metal frame and wire mesh made from stainless steel, having a mesh size of 45 μm (e.g., ASTM 325 mesh) and frame diameter of about 200 to 250 mm. Obtain a 1000 mL laboratory beaker. Obtain a drying oven, capable of being maintained at about 105° C. (+/−2° C.). Obtain a suitable microbalance with precision to 0.01 g. Record the tare weight of the clean dry sieve.
2. Weigh out 20 g (+/−0.01 g) of structurant raw material into the beaker, then add 400 g (+/−1 g) of distilled water at about 20° C. (+/−2° C.), to the beaker and stir to break-up and disperse any lumps, then continue stirring for 15 minutes (for non-limiting example using a suitable stir plate with magnetic stir bar) until a suspension or solution is formed. Gradually empty the contents of the beaker into the sieve such that no liquid overflows the rim. The liquid passing through the screen is not retained. Rinse the beaker with an additional 400 g of distilled water, and pour the rinse water through the screen. Place the screen into the drying oven and let it remain until water is evaporated. Weigh the sieve including the dried residue on the screen, then subtract the mass of the clean dry sieve to determine the mass of residue on the screen.
3. The residue factor is calculated as the residue mass/initial structurant raw material mass. in particular the Structurant Residue Factor is the dry mass ratio of structurant residue relative to the initial solid structurant mass.

Example 3

Structurant pH Test

This test method is used to measure the pH of the 5% structurant/water suspension, and is indicative of the relative acidity or alkalinity of the silica. The pH-value is measured by electrometry using a glass electrode in a pH-meter, for non-limiting example as described in ASTM test method D6739 (ASTM International, West Conshohocken, Pa.).

Example 5

Process for Making a Structurant

A structurant according to one embodiment of the current invention is formed by polymerization of silicate anions from aqueous solution, wherein an alkaline silicate is neutralized with an acid, both reactants added as aqueous solutions. Within this example, the term "relative molar" means the number of moles relative to the total molar amount of $SiO_2$ added to the synthesis.

In typical commercial silica processes, it is preferred to reach stoichiometric neutralization of alkali silicate and acid. In the current example, a less-than stoichiometric process may be used, retaining some alkali ions within the molecular structure of the amorphous colloidal silica. In one embodiment, sulfuric acid is used as follows:

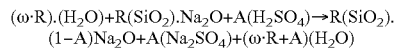

$$(\omega \cdot R).(H_2O)+R(SiO_2).Na_2O+A(H_2SO_4) \rightarrow R(SiO_2).(1-A)Na_2O+A(Na_2SO_4)+(\omega \cdot R+A)(H_2O)$$

where "A" is the amount of acid used in the reaction, relative to the stoichiometric ratio for complete neutralization, "R" is the silicate ratio, $[Na_2O]/[SiO_2]$, in the feedstock solution and "ω" is the relative molar amount of water added to the system, i.e., the total number of moles of water added to the system relative to moles of $SiO_2$, including aqueous silicate solution, aqueous acid solution, and optionally any additional water used in the starting heel of batch reaction vessels.

In this example, "A" can be from about 0.6 to about 1.0, preferably from about 0.7 to 0.9. In a system with less-than stoichiometric neutralization (i.e., A<1), the balance of un-neutralized $Na_2O$ is substantially retained in the amorphous silica phase. The molar ratio of $[Na_2O]/[SiO_2]$ in the amorphous silica may be from 0 to about 0.14 or from about 0.02 to about 0.14.

In this example, the neutralization reaction is done in a batch process, starting with an aqueous heel comprising a dilute silicate solution, and then adding aqueous silicate and acid reactants. The relative molar water in the system can be partitioned across the silicate solution (β), acid solution (α) and the heel (χ), $\alpha+\beta+\chi=\omega$.

The silicate ratio of the starting material, "R", is preferably in the range from about 1.6 to 3.4, more preferably from about 2.4 to 3.3, most preferably from about 2.8 to 3.2.

The relative molar amount of total water in the neutralization system (ω) is preferably from about 20 to 100, more preferably from about 25 to 75, even more preferably from about 30 to 60, most preferably from about 32 to 50. The total molar amount of water is distributed across reactant solutions (acid and silicate), with the balance added to the starting heel of the batch reactor. The relative molar amount of water in the acid solution (α) is preferably from about 0.4 to 10, more preferably from about 0.8 to 8, most preferably from about 1 to 5. The relative molar amount of water in the silicate solution (β) is preferably from about 8 to 50, more preferably from about 10 to 30, most preferably from about 12 to 20. The balance amount of water is in the heel.

Preferably, both reactant solutions are heated, preferably between about 60° C. and 80° C., and the batch reactor is jacketed to maintain a temperature of about 80° C. and 90° C. The reactor has a impeller capable of making a gentle vortex within the liquid in the reaction vessel. The addition points of the silica and acid solutions are directed as different sections of the vortex, preferably about 180° apart. The addition of silicate and acid solutions is done slowly over the course of about 90 minutes. The rate of acid is adjusted to maintain a pH objective in the reactor of about 9.5 to 11.0, preferably about 10.2 to 10.8, as measured using a suitable pH probe. As the neutralization proceeds, forming $Na_2SO_4$, the remaining material's silicate ratio, $[SiO_2]/[Na_2O]$, increases to about 6 after 10 to 20 minutes, and the suspension becomes noticeably turbid. While the silicate ratio plateaus at a value of about 6.5 to 8 during the remainder of the silicate addition, the salt concentration of $Na_2SO_4$ steadily increases. A viscosity increase in the stirred slurry is observed as the salt concentration approaches about 0.15 molar, typically at about 60 minutes. At about 90 minutes the total amount of silicate stock addition is complete, yet only about 55 wt % to 60 wt % of the stoichiometric acid amount will have been added. At this time, a final amount of acid is added to achieve a desired pH endpoint in the slurry.

For example, for a desired endpoint of about 8.5, about 90% of the stoichiometric amount of acid is used. This is illustrated in Table 1, for a batch made from the following: 65 Kg of 20% solids Silicate Stock having R=3.3; 22.6 Kg of 20% Sulfuric Acid Stock; and an 80 Kg starting heel consisting of an aqueous solution of 0.8% Silicate having R=3.3:

TABLE 1

| | mass added to reactor (Kg) | | | | | |
|---|---|---|---|---|---|---|
| time (m) | silicate stock | acid stock | total | Molar $SiO_2:Na_2O$ | Molar $Na_2SO_4$ | Comment |
| 0 | 0 | 0 | 80 | 3.3 | 0 | Starting heel, 80 Kg |
| 1 | 0.723 | 0.153 | 80.88 | 3.7 | 0.004 | Start silicate stock addition at |
| 8 | 5.781 | 1.227 | 87.01 | 5.2 | 0.029 | fixed rate, adjust acid to maintain |
| 15 | 10.840 | 2.301 | 93.14 | 5.9 | 0.050 | pH target of ~10.5 |

TABLE 1-continued

| | mass added to reactor (Kg) | | | | | |
|---|---|---|---|---|---|---|
| time (m) | silicate stock | acid stock | total | Molar $SiO_2:Na_2O$ | Molar $Na_2SO_4$ | Comment |
| 25 | 18.067 | 3.835 | 101.90 | 6.5 | 0.077 | |
| 45 | 32.520 | 6.904 | 119.42 | 6.9 | 0.118 | |
| 60 | 43.360 | 9.205 | 132.57 | 7.1 | 0.141 | |
| 80 | 57.814 | 12.273 | 150.09 | 7.3 | 0.166 | |
| 87 | 62.873 | 13.347 | 156.22 | 7.3 | 0.174 | Silicate addition complete, |
| 90 | 65.041 | 21.819 | 166.86 | 25.2 | 0.267 | add balance of acid to 90% |
| 92 | 65.041 | 22.604 | 167.64 | 33.1 | 0.275 | stoichiometry (pH~8.5) |
| 95 | 65.041 | 22.604 | 167.64 | 33.1 | 0.275 | |

The intermediate product of this reaction includes an aqueous slurry of colloidal silica particles having an amorphous molecular structure and an adjunct salt. In the example given in Table 1, the total solids concentration is about 10.4% in the slurry. The colloidal silica particles may be aggregated, for example in a micro-gel structure; in the example above, the silica phase comprises about 62% of the solids, and the ratio of $[Na_2O]:[SiO_2]$ within the silica is about 0.03. The adjunct salt may be dissolved in the aqueous solution and/or may be partially adsorbed into the colloidal silica structure, for example in a micro-gel; in the example above, the salt phase comprises about 38% of the solids. Optionally, some of the aqueous salt solution may be removed, for example using a filtration process, retaining a wet filter cake. The slurry or filter cake is subsequently dried, forming a product powder. When re-mixed with water in a suitably dilute system, the powder preferably has a significant degree of dispersion wherein colloidal silica aggregates can substantially disperse to a colloidal state. It is expected that the dispersion of silica aggregates is facilitated by the adjunct salt present, especially salt that is intimately mixed within the colloidal silica structures.

The product powder preferably has from about 0% to 40% water, more preferably from about 2% to 20% water, most preferably from about 4% to 10% water retained after drying.

By adjusting the concentration of stock solutions and heel, the neutralization reaction can be adjusted to achieve a solids yield in the range of about 5 wt % to 25 wt % of the aqueous system, preferably from about 8 wt % to 20 wt %, more preferably from about 10 wt % to 18 wt %, most preferably from about 12 wt % to 16 wt % of the aqueous system.

The adjunct salt content of the product can be further adjusted by filtration or augmentation. In filtration, the slurry is processed through a filter press. A portion of the salt is removed in the filtrate; the remainder of the salt solution is imbibed within the silica filter-cake. The filter cake is then dried, for example using a spin-flash dryer, to produce the structurant powder. In augmentation, additional salt, preferably in the form of a concentrated or even saturated aqueous solution, is added to the slurry, increasing the concentration of salt in the aqueous phase; then the slurry is dried, for example using a spray-dryer, to produce the structurant powder.

The Structruant pH, Structurant Residue Factor, and Structurant Saturation Capacity may be assessed as described above.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A structurant comprising:
   55 wt % to 90 wt % of a silica having a $[Na_2O]/[SiO_2]$ molar ratio of from 0.02 to 0.14; and
   at least 15 wt % of an adjunct salt,
   wherein the structurant has a hydrated particle size distribution such that no more than 30 wt % of the structurant has a hydrated particle size greater than 45 micrometers according to the Structurant Residue Test and a tapped bulk density of from 200 g/L to 300 g/L.

2. The structurant of claim 1, wherein the silica has a $[Na_2O]/[SiO_2]$ molar ratio of from 0.02 to 0.10.

3. The structurant of claim 2, wherein the silica has a $[Na_2O]/[SiO_2]$ molar ratio of from 0.04 to 0.08.

4. The structurant to claim 1, wherein the structurant has a tapped bulk density of from 200 g/L to 280 g/L.

5. The structurant of claim 4, wherein the structurant has a tapped bulk density of from 220 g/L to 280 g/L.

6. The structurant of claim 1, wherein the structurant has a pH of from 8.5 to 11.0.

7. The structurant of claim 6, wherein the structurant has a pH of from 9.0 to 10.5.

8. The structurant of claim 7, wherein the structurant has a pH of from 9.5 to 10.0.

9. The structurant of claim 1, wherein the structurant has an oil absorbency of at least 170 g/100 g.

10. The structurant of claim 1, wherein the structurant has a Saturation Capacity of at least about 1.7 g/g as determined by a Saturation Capacity Test.

11. The structurant of claim 1, wherein the adjunct salt comprises an alkali metal salt.

12. The structurant of claim 1, further comprising between 0 wt % to 40 wt % water.

13. The structurant of claim 1, further comprising between 2 wt % and 20 wt % water.

14. The structurant of claim 1, further comprising between 4 wt % and 10 wt % water.

* * * * *